United States Patent
Arakawa et al.

(10) Patent No.: US 8,252,197 B2
(45) Date of Patent: Aug. 28, 2012

(54) AGENT FOR PROCESSING POLYURETHANE ELASTOMER FIBERS

(75) Inventors: Yasunobu Arakawa, Aichi (JP); Jun Ito, Aichi (JP)

(73) Assignee: Takemoto Yushi Kabushiki Kaisha, Gamagori-shi (JP)

( * ) Notice: Subject to any disclaimer, the term of this patent is extended or adjusted under 35 U.S.C. 154(b) by 210 days.

(21) Appl. No.: 12/837,913

(22) Filed: Jul. 16, 2010

(65) Prior Publication Data

US 2011/0046317 A1 Feb. 24, 2011

(30) Foreign Application Priority Data

Aug. 20, 2009 (JP) ................................. 2009-190666

(51) Int. Cl.
 *D06M 13/224* (2006.01)
(52) U.S. Cl. ............... 252/8.84; 252/182.2; 252/182.23; 252/182.28; 264/211; 428/364; 428/375; 428/394; 516/30; 516/31; 525/453; 525/454; 528/403; 528/405; 528/486; 560/129; 560/240; 560/263; 560/265

(58) Field of Classification Search .................. 252/8.84, 252/182.28, 182.2, 182.23; 264/211; 428/364, 428/375, 394; 516/20, 31; 525/453, 454; 528/403, 405, 486; 560/129, 240, 263, 265
See application file for complete search history.

(56) References Cited

U.S. PATENT DOCUMENTS 7,351,350 B2 * 4/2008 Aratani ........................ 252/8.61

FOREIGN PATENT DOCUMENTS

JP 2004-092011 * 3/2004

* cited by examiner

*Primary Examiner* — David W Wu
*Assistant Examiner* — Robert Jones, Jr.
(74) *Attorney, Agent, or Firm* — Weaver Austin Villeneuve & Sampson LLP

(57) ABSTRACT

A processing agent for processing urethane elastomer fibers contains a disperse medium of a specified kind having mineral oil as its principal component and a dispersoid of a specified kind including aliphatic ester compound. The disperse medium is 80-99.99% by mass and the dispersoid is 0.01-20% by mass for a total of 100% by mass. The average particle size of the dispersoid is prepared to be in the range of 0.01-500 μm as measured by a specified measuring method.

16 Claims, No Drawings

AGENT FOR PROCESSING POLYURETHANE ELASTOMER FIBERS

Priority is claimed on Japanese Patent Application 2009-190666 filed Aug. 20, 2009.

BACKGROUND OF THE INVENTION

This invention relates to agents for processing polyurethane elastomer fibers. This invention relates more particularly to agents for processing polyurethane elastomer fibers capable of providing a package having superior roll shape and unwinding property in the production of polyurethane elastomer fibers and superior smoothness, antistatic property and hot melt adhesive property to polyurethane elastomer fibers.

Examples of conventionally known agent for processing polyurethane elastomer fibers include those having solid metallic soap dispersed in polydimethyl siloxane or mineral oil (such as disclosed in Japanese Patent Publications Tokko 41-286 and 40-5557 and Tokkai 9-217283), those containing polyoxyalkylene ether modified polysiloxane (such as disclosed in Japanese Patent Publications Tokkai 9-268477 and 9-296377), and those containing polypropylene glycol polyols (such as disclosed in Japanese Patent Publication Tokkai 2000-327224 (U.S. Pat. No. 6,280,841)). These prior art agents for processing polyurethane elastomer fibers have problems in that they involve serious troubles in the production or fabrication of polyurethane elastomer fibers such as inferior roll shape of the package resulting in the production of the polyurethane elastomer fibers, inferior hot melt adhesive property provided to the polyurethane elastomer fibers or insufficient smoothness or antistatic property provided to the polyurethane elastomer fibers such that stable operability cannot be attained.

It is therefore an object of this invention to provide agents for processing polyurethane elastomer fibers capable of providing a package having superior roll shape and unwinding property in the production of polyurethane elastomer fibers and superior smoothness, antistatic property and hot melt adhesive property to polyurethane elastomer fibers.

The inventors herein have completed the present invention by discovering, as a result of their research in view of the aforementioned object, that appropriately suitable agents for processing polyurethane elastomer fibers can be obtained by dispersing a dispersoid of a specified kind at a specified rate in a specified disperse medium.

SUMMARY OF THE INVENTION

This invention relates to an agent for processing polyurethane elastomer fibers, consisting of a disperse medium and a dispersoid of specified kinds. The disperse medium is contained at a rate of 80-99.99% by mass and the dispersoid is contained at a rate of 0.01-20% by mass such that their total will be 100% by mass. The dispersoid is prepared as particles with an average particle size of 0.01-500 μm as measured by a specified measuring method described below.

The disperse medium is a liquid consisting of 70-100% by mass of mineral oil and 0-30% by mass of silicone oil and/or liquid ester oil for a total of 100% by mass and having a viscosity of $2 \times 10^{-6}$-$1000 \times 10^{-6}$ m$^2$/s at 25° C.

The dispersoid is one or more aliphatic compounds having a melting point of 25° C. or above selected from the group consisting of aliphatic ester compounds shown by Formula 1, aliphatic ester compounds shown by Formula 2, aliphatic ester compounds shown by Formula 3 and aliphatic ester compounds shown by Formula 4 where Formula 1 is $R^1$—O—$X^1$, Formula 2 is $X^2$—O-A-O—$X^3$, Formula 3 is

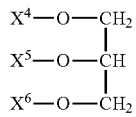

and Formula 4 is

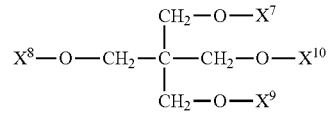

where $R^1$ is a straight-chain aliphatic hydrocarbon group with 14-50 carbon atoms, a branched aliphatic hydrocarbon group with 14-50 carbon atoms or cycloalkyl group with or 6 carbon atoms; A is a residual group obtained by removing all hydroxy groups from (poly)oxyalkylene glycol with 2-30 carbon atoms having within its molecule (poly)oxyalkylene group formed with oxyalkylene unit with 2-10 carbon atoms; $X^1$ is an acyl group shown by Formula 5, which is

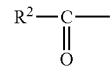

$R^2$ being a straight-chain aliphatic hydrocarbon group with 13-49 carbon atoms, a branched aliphatic hydrocarbon group with 13-49 carbon atoms or cycloalkyl group with 5 or 6 carbon atoms; and $X^2$-$X^{10}$ are each acyl group shown by Formula 5 or hydrogen atom, at least one of $X^2$ and $X^3$ in Formula 2 being acyl group shown by Formula 5, at least one of $X^4$-$X^6$ in Formula 3 being acyl group shown by Formula 5, at least one of $X^7$-$X^{10}$ in Formula 4 being acyl group shown by Formula 5.

The specified measuring method for the invention comprises the steps of obtaining a diluted liquid by diluting the agent for processing polyurethane elastomer fibers by using a 1/1 mixture in mass ratio of polydimethyl siloxane and mineral oil both with viscosity of $10 \times 10^{-6}$ m$^2$/s at 25° C. such that the concentration of dispersoid in the agent for processing polyurethane elastomer fibers becomes 1000 mg/L and providing this diluted liquid to a laser diffraction particle size analyzer at liquid temperature of 25° C. to measure the average particle size on volume standard.

The invention also relates to a method of processing polyurethane elastomer fibers comprising the step of causing an agent as described above to adhere to the polyurethane elastomer fibers at a rate of 0.1-10% by mass during their spinning process by a heat oiling method without dilution.

The invention further relates to polyurethane elastomer fibers obtained by the method of this invention as described above.

An agent for processing polyurethane elastomer fibers according to this invention (hereinafter referred to simply as the agent of this invention) will be explained first. The agent of this invention is for becoming adhered to polyurethane elastomer fibers as they are being produced and is characterized as comprising a disperse medium and a dispersoid of specified kinds.

The disperse medium for the agent of this invention is a liquid containing mineral oil at a rate of 70-100% by mass and silicone oil and/or liquid ester oil at a rate of 0-30% by mass (to make a total of 100% by mass) and having a viscosity of $2\times10^{-6}$-$1000\times10^{-6}$ m$^2$/s at 25° C.

Examples of the mineral oil that may be used include general petroleum distillate fractions containing paraffin, naphthene and aromatic components, and although there is no particular limitation on the components, those having a viscosity within the range of $2\times10^{-6}$-$100\times10^{-6}$ m$^2$/s at 25° C. are preferable.

Examples of silicone oil include polydimethyl siloxane having dimethyl siloxane units as constituent units, polydialkyl siloxane having dimethyl siloxane unit and dialkyl siloxane unit with alkyl group with 2-4 carbon atoms as constituent units, and polysiloxane having dimethyl siloxane unit and methylphenyl siloxane unit as constituent units but polydimethyl siloxane is preferable.

Examples of liquid ester oil include (1) esters of aliphatic monohydric alcohol and aliphatic monocarboxylic acid such as butyl stearate, octyl stearate, oleyl laurate, oleyl oleate, isotridecyl stearate and isopentacosenyl isostearate; (2) esters of aliphatic polyhydric alcohol and aliphatic monocarboxylic acid such as 1,6-hexanediol didecanoate, trimethylol propane monooleate monolaurate, trimethylol propane trilaurate, sorbitan monooleate, sorbitan trioleate and natural oils and fats such as castor oil; and (3) esters of aliphatic monohydric alcohol and aliphatic polyhydric carboxylic acid such as dilauryl adipate and dioleyl azelate. Of these, esters of aliphatic monohydric alcohol and aliphatic monocarboxylic acid with 15-40 carbon atoms such as octyl stearate and isotridecyl stearate and esters of aliphatic polyhydric alcohol and aliphatic monocarboxylic acid with 15-40 carbon atoms such as trimethylol propane trilaurate and castor oil are preferable.

Such examples of disperse medium are characterized as containing 70-100% by mass of mineral oil and 0-30% by mass of silicone oil and/or liquid ester oil (to make a total of 100% by mass) but those containing 85-100% by mass of mineral oil and 0-15% by mass of silicone oil and/or liquid ester oil (to make a total of 100% by mass) are particularly preferable and those containing mineral oil by 100% by mass are even more preferable. If mineral oil is contained by less than 70% by mass, the hot melt adhesive property of the polyurethane elastomer fibers obtained as a result is significantly inferior.

The disperse medium is a liquid with a viscosity within the range of $2\times10^{-6}$-$1000\times10^{-6}$ m$^2$/s at 25° C. but those with the viscosity within the range of $2\times10^{-6}$-$100\times10^{-6}$ m$^2$/s at 25° C. are preferable. If the viscosity at 25° C. is less than $2\times10^{-6}$ m$^2$/s, the agent tends to scatter off excessively when it is applied onto polyurethane elastomer fibers. If the viscosity at 25° C. exceeds $1000\times10^{-6}$ m$^2$/s, on the other hand, it becomes difficult to obtain a desirable level of smoothness by applying such an agent to polyurethane elastomer fibers. The viscosity is herein to be understood as a measured value obtained by a method using a Cannon-Fenske viscometer described in JIS-K2283 (kinematic viscosity test method for petroleum product).

The dispersoid that is to be used according to this invention is (1) an aliphatic ester compound shown by Formula 1, (2) an aliphatic ester compound shown by Formula 2, (3) an aliphatic ester compound shown by Formula 3, (4) an aliphatic ester compound shown by Formula 4, or (5) an arbitrary mixture of the above, having a melting point of 25° C. or above.

Regarding the aliphatic ester compound shown by Formula 1, $R^1$ in Formula 1 is a straight-chain aliphatic hydrocarbon group with 14-50 carbon atoms, a branched aliphatic hydrocarbon group with 14-50 carbon atoms or cycloalkyl group with 5 or 6 carbon atoms. Examples of straight-chain aliphatic hydrocarbon group with 14-50 carbon atoms include (1) straight-chain or branched alkyl groups such as n-tetradecyl group, n-hexadecyl group, octadecyl group, icosyl group, docosyl group, tetracosyl group, hexacosyl group, octacosyl group, triacontyl group, dotriacontyl group, tetratriacontyl group, hexatriacontyl group, octatriacontyl group, tetracontyl group, dotetracontyl group, isooctadecyl group, isodocosyl group, isohexacosyl group, isooctacosyl group, isotriacontyl group, isodotriacontyl group and isotetratriacontyl group; (2) straight-chain or branched alkenyl groups such as cis-9-octadecenyl group, 11-heptadecenyl group, 11-octadecenyl group, cis,cis-9,12-octadecadienyl group, 8,11-icosadienyl group, cis-15-tetracocenyl group, cis-8-dotriacontenyl group and cis-4,8-ethyl-triacontryl group; and (3) straight-chain or branched alkinyl groups such as 8-octadecinyl group, 1-nonadecinyl group, 1-icosinyl group, 8-docosinyl group, 6-tricosinyl group, 8-tetracosinyl group, 8-hexacosinyl group, 8-heptacosinyl group, 8-octacosinyl group, 4-triacontinyl group, 8-nonacosinyl group, 8-dotriacontinyl group, 6-tetracontinyl group and 4-ethyl-hexacosinyl group. Examples of cycloalkyl group with 5 or 6 carbon atoms include cyclopentyl group and cyclohexyl group. Regarding $R^1$, alkyl groups with 18-38 carbon atoms are preferable and alkyl groups with 22-36 carbon atoms are even more preferable.

Regarding the aliphatic ester compounds shown by Formula 1, $X^1$ in Formula 1 is an acyl group shown by Formula 5.

Regarding the acyl group shown by Formula 5, $R^2$ in Formula 5 is a straight-chain aliphatic hydrocarbon group with 13-49 carbon atoms, a branched aliphatic hydrocarbon group with 13-49 carbon atoms or a cycloalkyl group with 5 or 6 carbon atoms. Examples of such straight-chain aliphatic hydrocarbon group with 13-49 carbon atoms include (1) straight-chain or branched alkyl groups such as tridecyl group, pentadecyl group, heptadecyl group, octadecyl group, nonadecyl group, henicosyl group, tricosyl group, tetracosyl group, pentacosyl group, hexacosyl group, heptacosyl group, octacosyl group, nonacosyl group, triacontyl group, hentriacontyl group, dotriacontryl group, tritriacontyl group, heptatriacontyl group, nonatriacontyl group, hentetracontyl group, dotetracontyl group, isoheptadecyl group, isooctadecyl group, isononadecyl group, isotricosyl group, isotetracosyl group, isopentacosyl group, isohexacosyl group, isoheptacosyl group, isooctacosyl group, isononacosyl group, isotricontyl group, isohentriacontyl group, isotritriacontyl group and isoheptatriacontyl group; (2) straight-chain or branched alkenyl groups such as cis-9-octadecenyl group, 11-heptadecenyl group, cis-cis-9,12-octadecadienyl group, 8,11-nonadecadienyl group, cis-15-pntacocenyl group, cis-8-dotriacontenyl group and cis-4,8-ethyl-triacontenyl group; and (3) straight-chain or branched alkinyl groups such as 8-octadecinyl group, 1-nonadecinyl group, 1-icosinyl group, 8-docosinyl group, 6-tricosinyl group, 8-tetracosinyl group, 8-hexacosinyl group, 8-heptacosinyl group, 8-octacosinyl group, 4-triacontinyl group, 8-nonacosinyl group, 8-dotriacosinyl group, 6-tetracontinyl group and 4-ethyl-hexaconsinyl group. Examples of cycloalkyl group with 5 or 6 carbon atoms include cyclopentyl group and cyclohexyl group. As $R^2$, alkyl groups with 17-37 carbon atoms are preferable and alkyl groups with 21-35 carbon atoms are even more preferable.

Examples of aliphatic ester compound shown by Formula 1 include myristyl myristinate, myristyl stearate, myristyl behenilate, myristyl montanate, stearyl stearate, stearyl behenilate, stearyl lignocerate, isostearyl stearate, behenyl stearate, behenyl behenilate, behenyl lignocerate, lignoceryl myristinate, lignoceryl behenilate, lignoceryl lignocerate, lignoceryl montanate, lignoceryl melissilate, montanyl stearate, montanyl stearate, montanyl behenilate, montanyl lignocerate, montanyl montanate and melissinyl melissinate. In particular, stearyl stearate, stearyl behenilate, stearyl lignocerate, isostearyl stearate, behenyl stearate, behenyl behenilate, behenyl lignocerate, lignoceryl behenilate, lignoceryl lignocerate, lignoceryl montanate, lignoceryl melissinate, montanyl stearate, montanyl behenilate, montanyl lignocerate, montanyl montanate and melissinyl melissinate are preferable, and behenyl behenylate, behenyl lignocerate, lignoceryl behenilate, lignoceryl lignocerate, lignoceryl montanate, lignoceryl melissinate, montanyl stearate, montanyl behenilate, montanyl lignocerate, montanyl montanate and melissinyl melissinate are even more preferable.

Regarding the aliphatic ester compounds shown by Formula 2, $X^2$ and $X^3$ in Formula 2 are each an acyl group shown by Formula 5 or hydrogen atom but at least one of $X^2$ and $X^3$ is to be an acyl group shown by Formula 5.

Regarding the aliphatic ester compounds shown by Formula 2, A in Formula 2 is a residual group obtained by removing all hydroxy groups from (poly)oxyalkylene glycol with 2-30 carbon atoms having within its molecule (poly)oxyalkylene group formed with oxyalkylene unit with 2-10 carbon atoms. Preferable examples of A include residual groups obtained by removing all hydroxy groups from ethylene glycol, propylene glycol or 1,4-butanediol.

Examples of such aliphatic ester compound shown by Formula 2 include monohydric or dihydric aliphatic ester compounds synthesized from aliphatic acid such as (1) a saturated aliphatic acid such as myristic acid, pentadecylic acid, palmitic acid, heptadecylic acid, stearic acid, nonadecanoic acid, arakinic acid, behenic acid, lignoceric acid, cerotic acid, heptacosanoic acid, montanic acid, melissinic acid and lacceric acid; (2) an unsaturated aliphatic acid such as oleic acid, elaidic acid, 11-docosenoic acid, erucic acid, brassidic acid, sorbic acid, linoleic acid, linolenic acid, arachidonic acid, sardine acid, herring acid, propiolic acid and sterolic acid; (3) an aliphatic acid having branched hydrocarbon group such as isostearic acid, or (4) an alicyclic aliphatic acid such as malvalic acid, sterculic acid, chaulmoogric acid and gorlic acid and a diol such as ethylene glycol, 1,2-propane diol, 1,4-butane diol, 1,6-hexamethylene diol, polyethylene glycol, polypropylene glycol, polyethylene polypropylene glycol, polytetramethylene glycol and polyhexamethylene glycol. Of the above, monohydric or dihydric aliphatic ester compounds synthesized from aliphatic acid with 18-38 carbon atoms such as stearic acid, nonadecanoic acid, arakinic acid, behenic acid, lignoceric acid, cerotic acid, heptacosaic acid, montanic acid, melissinic acid, lacceric acid and isostearic acid and ethylene glycol, 1,2-propane diol or 1,4-butane diol are preferable and monohydric or dihydric aliphatic ester compounds synthesized from aliphatic acid with 22-36 carbon atoms such as behenic acid, lignoceric acid, cerotic acid, heptacosaic acid, montanic acid, melissinic acid and lacceric acid and ethylene glycol, 1,2-propane diol or 1,4-butane diol are even more preferable.

Regarding the aliphatic ester compounds shown by Formula 3, $X^4$, $X^5$ and $X^6$ in Formula 3 are each an acyl group shown by Formula 5 or hydrogen atom but at least one of $X^4$, $X^5$ and $X^6$ is to be an acyl group shown by Formula 5.

Examples of such aliphatic ester compound shown by Formula 3 include monohydric—trihydric aliphatic ester compounds synthesized from aliphatic acid such as (1) a saturated aliphatic acid such as myristic acid, pentadecylic acid, palmitic acid, heptadecylic acid, stearic acid, nonadecanoic acid, arakinic acid, behenic acid, lignoceric acid, cerotic acid, heptacosanoic acid, montanic acid, melissinic acid and lacceric acid; (2) an unsaturated aliphatic acid such as oleic acid, elaidic acid, 11-docosenoic acid, erucic acid, brassidic acid, sorbic acid, linoleic acid, linolenic acid, arachidonic acid, sardine acid, herring acid, propiolic acid and sterolic acid; (3) an aliphatic acid having branched hydrocarbon group such as isostearic acid, or (4) an alicyclic aliphatic acid such as malvalic acid, sterculic acid, chaulmoogric acid and gorlic acid and glycerol. Of the above, monohydric-trihydric aliphatic ester compounds synthesized from aliphatic acid with 18-38 carbon atoms such as stearic acid, nonadecanoic acid, arakinic acid, behenic acid, lignoceric acid, cerotic acid, heptacosaic acid, montanic acid, melissinic acid, lacceric acid and isostearic acid and glycerol are preferable and monohydric-trihydric aliphatic ester compounds synthesized from aliphatic acid with 22-36 carbon atoms such as behenic acid, lignoceric acid, cerotic acid, heptacosaic acid, montanic acid, melissinic acid and lacceric acid and glycerol are even more preferable.

Regarding the aliphatic ester compounds shown by Formula 4, $X^7$, $X^8$, $X^9$ and $X^{10}$ in Formula 4 are each an acyl group shown by Formula 5 or hydrogen atom but at least one of $X^7$, $X^8$, $X^9$ and $X^{10}$ is to be an acyl group shown by Formula 5.

Examples of such aliphatic ester compound shown by Formula 4 include monohydric-tetrahydric aliphatic ester compounds synthesized from aliphatic acid such as (1) a saturated aliphatic acid such as myristic acid, pentadecylic acid, palmitic acid, heptadecylic acid, stearic acid, nonadecanoic acid, arakinic acid, behenic acid, lignoceric acid, cerotic acid, heptacosanoic acid, montanic acid, melissinic acid and lacceric acid; (2) an unsaturated aliphatic acid such as oleic acid, elaidic acid, 11-docosenoic acid, erucic acid, brassidic acid, sorbic acid, linoleic acid, linolenic acid, arachidonic acid, sardine acid, herring acid, propiolic acid and sterolic acid; (3) an aliphatic acid having branched hydrocarbon group such as isostearic acid, or (4) an alicyclic aliphatic acid such as malvalic acid, sterculic acid, chaulmoogric acid and gorlic acid and pentaerythritol. Of the above, monohydric-tetrahydric aliphatic ester compounds synthesized from aliphatic acid with 18-38 carbon atoms such as stearic acid, nonadecanoic acid, arakinic acid, behenic acid, lignoceric acid, cerotic acid, heptacosaic acid, montanic acid, melissinic acid, lacceric acid and isostearic acid and pentaerythritol are preferable and monohydric-tetrahydric aliphatic ester compounds synthesized from aliphatic acid with 22-36 carbon atoms such as behenic acid, lignoceric acid, cerotic acid, heptacosaic acid, montanic acid, melissinic acid and lacceric acid and pentaerythritol are even more preferable.

The dispersoid to be used for the agent of this invention is, as explained above, (1) an aliphatic ester compound shown by Formula 1, (2) an aliphatic ester compound shown by Formula 2, (3) an aliphatic ester compound shown by Formula 3, (4) an aliphatic ester compound shown by Formula 4, or (5) a mixture of the above, having a melting point of 25° C. or above but those selected from aliphatic ester compounds shown by Formula 2 and aliphatic ester compounds shown by Formula 3 are preferable and either of aliphatic ester compounds shown by Formula 2 and aliphatic ester compounds shown by Formula 3, contributing to dispersion stability of the agent of this invention and exhibiting superior storage stability, is even more preferable and mixtures thereof.

The agent of this invention includes a disperse medium and a dispersoid as explained above, containing the disperse medium by 80-99.99% by mass and the dispersoid by 0.01-20% by mass to make a total of 100% by mass but it is preferable to contain the disperse medium by 90-99.9% by mass and the dispersoid by 0.1-10% by mass to make a total of 100% by mass. If the disperse medium is contained by 80-99.99% by mass and the dispersoid is contained by 0.01-20% by mass to make a total of 100% by mass, the thixotropy possessed by the agent of this invention can be appropriately controlled and a superior storage stability is exhibited.

The agent of this invention comprises a disperse medium and a dispersoid as explained above, containing the disperse medium by 80-99.99% by mass and the dispersoid by 0.01-20% by mass to make a total of 100% by mass, the dispersoid being prepared so as to have an average particle size of 0.01-500 μm or preferably 0.1-100 μm. In the above, the average particle size means the value obtained by using a 1/1 mixture in mass ratio of polydimethyl siloxane and mineral oil both with viscosity of $10 \times 10^{-6}$ m$^2$/s at 25° C. to dilute the agent for processing polyurethane elastomer fibers such that the concentration of the dispersoid in the agent for processing polyurethane elastomer fibers becomes 1000 mg/L and providing this diluted liquid to a laser diffraction particle size analyzer at liquid temperature of 25° C. to measure the average particle size on volume standard.

The agent of this invention can be prepared by a known method. For example, it may be obtained as a uniformly dispersed liquid by mixing a disperse medium and a dispersoid at a specified ratio and providing this mixture to a wet-type grinder such as a vertical beads mill, a horizontal beads mill, a sand grinder or a colloid mill. The temperature at the mixing of the components and that at the wet-type grinding may preferably be 20-35° C. The viscosity of the dispersion liquid may preferably be adjusted to the range of $2 \times 10^{-6}$-$1000 \times 10^{-6}$ m$^2$/s as measured at 25° C. by using a Cannon-Fenske viscometer described in JIS-K2283 (kinematic viscosity test method for petroleum product).

The agent of this invention may be used together with components such as a connecting agent, an antistatic agent, a wetting agent, amino modified polydimethyl siloxane, modified silicone oils such as polyether modified polydimethyl siloxane, silicone resins, anion surfactants, nonion surfactants, cation surfactants, amphoteric surfactants appropriately whenever necessary within a limit of not detrimentally affecting the effects of the invention. It is desirable to use such components as little as possible, and it is preferable of use 5 mass parts or less of these additives against 100 mass parts of the agent of this invention.

Next, a method of this invention for processing polyurethane elastomer fibers (hereinafter referred to as the processing method of this invention) is described. The processing method of this invention comprises causing the agent of this invention to adhere to polyurethane elastomer fibers at a rate of 0.1-10% by mass during a spinning process of the polyurethane elastomer fibers by a neat oiling method without dilution.

According to the processing method of this invention, the agent of this invention is caused to adhere to polyurethane elastomer fibers by a heat oiling method whereby the agent is not diluted by a solvent or the like but is directly applied. This process takes place during the spinning process of the polyurethane elastomer fibers. A known oiling method such as the roller oiling method, the guide oiling method and the spray oiling method may be used for the application. Although the agent is applied at a rate of 0.1-10% by mass with respect to the polyurethane elastomer fibers, it is preferable to apply at a rate of 2-6% by mass.

The polyurethane elastomer fibers according to this invention will be finally explained. The polyurethane elastomer fibers according to this invention are characterized as being obtained by the processing method described above.

Within the framework of this invention, the polyurethane elastomer fibers mean elastomer fibers having polyurethane substantially as the principal component and normally mean what are obtained by spinning from a long-chain polymer containing segmented polyurethane by 85% or more by mass.

Long-chained polymers are provided with so-called soft and hard segments. Soft segments are segments with a relatively long chain such as polyethers, polyesters and polyetheresters and hard segments are segments with a relatively short chain derived by a reaction between isocyanate and a diamine or diol chain elongation agent. Such polymers with a long chain are usually produced by terminating the soft segment precursor of the end hydroxy with organic diisocyanate to cause a prepolymer to grow and elongating the chain of this prepolymer with diamine or diol.

Examples of polyether of a soft segment include those derived from 1,4-butanediol, 3-methyl-1,5-pentanediol, tetrahydrofuran and 3-methyltetrahydrofuran. Among these examples, those derived from 1,4-butanediol are preferable. Examples of aforementioned polyester include those derived from ethylene glycol, 1,4-butanediol, 2,2-dimethyl-1,3-propanediol, etc. and a dibasic acid such as adipic acid and succinic acid. Examples of aforementioned polyetherester include those derived from a polyether and a polyester.

Examples of aforementioned organic diisocyanate which is used for terminating the soft segment precursor include bis-(p-isocyanate phenyl)-methane (MDI), trilene diisocyanate (TDI), bis-(4-isocyanate cyclohexyl)-methane (PICM), hexamethylene diisocyanate and 3,3,5-trimethyl-5-methylene cyclohexyl diisocyanate. Preferable among these examples is MDI.

Examples of aforementioned diamine which is used for elongating the chain of prepolymer include ethylene diamine, 1,3-cyclohexane diamine and 1,4-cyclohexane diamine.

Examples of aforementioned diol which is used for elongating the chain of prepolymer include ethylene glycol, 1,3-propanediol, 1,4-butanediol, neopentyl glycol, 1,2-propylene glycol, 1,4-cyclohexane dimethanol, 1,4-cyclohexandiol, 1,4-bis(β-hydroxyethoxy)benzene, bis(β-hydroxyethyl) terephthalate and paraxylenediol. Although long-chain polymers serving as materials for polyurethane elastomer fibers have been explained above, the present invention does not impose any particular limitation on the method of polymerizing such long-chain polymers.

The long-chain polymers serving as materials for polyurethane elastomer fibers may contain an ultraviolet light absorbing agent such as benzotriazole-type, a weather-resisting agent such as hindered amine-type, an antioxidant agent such as hindered phenol-type, pigments of various kinds such as titanium oxide and iron oxide and a functional additive such as barium sulfate, zinc oxide, cesium oxide and silver ions.

Examples of the solvent to be used for spinning polyurethane elastomer fibers by using long-chain polymers as a material include N,N-dimethyl acetoamide (DMAc), dimethyl formamide, dimethyl sulfoxide and N-methylpyrrolidone, but DMAc is preferable. It is preferable in the dry-type spinning method using a solvent to adjust the concentration of the long-chain polymers to be 30-40% by mass and in particular to 35-38% by mass with reference to the total mass of the solution.

Polyurethane elastomer fibers are usually spun by the melt spinning method, the dry spinning method or the wet spinning method when diol is used as the chain elongation agent and by the dry spinning method when diamine is used as the chain elongation agent. The present invention does not impose any particular limitation on the spinning method but a dry spinning method using a solvent is preferable.

According to the present invention as explained above, a package having superior roll shape and unwinding property can be obtained in the production of polyurethane elastomer fibers. The present invention also has the advantage of providing polyurethane elastomer fibers with superior smoothness, antistatic property and hot melt adhesive property. As a result, it is made possible to obtain polyurethane elastomer fibers with a high quality under stable operations.

EMBODIMENTS OF THE INVENTION

Embodiments of the invention will be described in what follows in order to more specifically show its details and effects but it goes without saying that these embodiments are not intended to limit the scope of the invention. In the following, "parts" will mean "mass parts" and "%" will mean "% by mass".

Part 1 (Preparation of Dispersoid)

Preparation of Aliphatic Ester Compound (ES-1) Shown by Formula 1

After octacosyl alcohol 410.28 g and montanic acid 424.28 g were placed inside a reactor and uniformly dissolved by raising the temperature to 150° C. in a nitrogen atmosphere, an esterification reaction was carried out for 2 hours by adding sulfuric acid 1.7 g under a reduced pressure condition of 10 mmHg while generated water was removed. After the completion of the reaction, a 40% aqueous solution of sodium hydroxide 1.75 g was added for neutralization, and dehydration was carried out again. After the content was cooled and solidified once, it was roughly ground by a ball mill to obtain aliphatic ester compound (ES-1). This aliphatic ester compound (ES-1) was solid at 25° C.

Preparation of Aliphatic Ester Compounds (ES-2)-(ES-4) Shown by Formula 1 and Comparison Aliphatic Ester Compounds (es-1) and (es-2) for Comparison Aliphatic ester compounds (ES-2)-(ES-4) shown by Formula 1 and comparison aliphatic ester compounds (es-1) and (es-2) for comparison as shown in Table 1 were prepared in the same way as aliphatic ester compound (ES-1).

Preparation of Aliphatic Ester Compound (ES-5) Shown by Formula 2

After 1,4-butanediol 90.04 g, montanic acid methyl ester 876.58 g and dibutyl tin dilaurate 1.9 g were placed inside a reactor, temperature was raised to 190° C. in a nitrogen atmosphere for 5 hours and generated methanol was removed. An esterification reaction was thereafter carried out under a reduced pressure condition of 10 mmHg while generated methanol was further removed. After the completion of the reaction, the content was cooled and solidified once and was roughly ground by a ball mill to obtain aliphatic ester compound (ES-5). This aliphatic ester compound (ES-5) was solid at 25° C.

Preparation of Aliphatic Ester Compounds (ES-6)-(ES-10) Shown by Formula 2 and Comparison Aliphatic Ester Compounds (es-3)-(es-6) for Comparison Aliphatic ester compounds (ES-6)-(ES-10) shown by Formula 2 and comparison aliphatic ester compounds (es-3)-(es-6) for comparison as shown in Table 2 were prepared in the same way as aliphatic ester compound (ES-5).

Preparation of Aliphatic Ester Compound (ES-11) Shown by Formula 3

After glycerol 92.03 g, montanic acid methyl ester 1314.87 g and dibutyl tin dilaurate 2.7 g were placed inside a reactor, temperature was raised to 190° C. in a nitrogen atmosphere for 5 hours and generated methanol was removed. An esterification reaction was thereafter carried out under a reduced pressure condition of 10 mmHg while generated methanol was further removed. After the completion of the reaction, the content was cooled and solidified once and was roughly ground by a ball mill to obtain aliphatic ester compound (ES-11). This aliphatic ester compound (ES-11) was solid at 25° C.

Preparation of Aliphatic Ester Compounds (ES-12), (ES-13), (ES-15) and (ES-16) Shown by Formula 3 and Comparison Aliphatic Ester Compound (es-7) for Comparison Aliphatic ester compounds (ES-12), (ES-13), (ES-15) and (ES-16) shown by Formula 3 and comparison aliphatic ester compound (es-7) for comparison as shown in Table 3 were prepared in the same way as aliphatic ester compound (ES-11).

Preparation of Aliphatic Ester Compound (ES-14) Shown by Formula 3

After glycerol 92.03 g, montanic acid methyl ester 438.29 g, cerotic acid methyl ester 410.27 g and dibutyl tin dilaurate 1.8 g were placed inside a reactor, temperature was raised to 190° C. in a nitrogen atmosphere for 5 hours and generated methanol was removed. An esterification reaction was thereafter carried out under a reduced pressure condition of 10 mmHg while generated methanol was further removed. After the completion of the reaction, the content was cooled and solidified once and was roughly ground by a ball mill to obtain aliphatic ester compound (ES-14). This aliphatic ester compound (ES-14) was solid at 25° C.

Preparation of Aliphatic Ester Compound (ES-17) Shown by Formula 4

After pentaerythritol 136.05 g, dotriacontanic acid methyl ester 1977.32 g and dibutyl tin dilaurate 4.2 g were placed inside a reactor, temperature was raised to 190° C. in a nitrogen atmosphere for 5 hours and generated methanol was removed. An esterification reaction was thereafter carried out under a reduced pressure condition of 10 mmHg while generated methanol was further removed. After the completion of the reaction, the content was cooled and solidified once and was roughly ground by a ball mill to obtain aliphatic ester compound (ES-17). This aliphatic ester compound (ES-17) was solid at 25° C.

Preparation of Aliphatic Ester Compounds (ES-18)-(ES-21) Shown by Formula 4 and Comparison Aliphatic Ester Compound (es-8) for Comparison Aliphatic ester compounds (ES-18)-(ES-21) shown by Formula 4 and comparison aliphatic ester compound (es-8) for comparison as shown in Table 4 were prepared in the same way as aliphatic ester compound (ES-17).

TABLE 1

| Dispersoid | Aliphatic ester compound shown by Formula 1 | | |
|---|---|---|---|
| | $X^1$ | $R^1$ | Condition at 25° |
| ES-1 | X-1 | R-1 | Solid |
| ES-2 | X-2 | R-2 | Solid |
| ES-3 | X-3 | R-3 | Solid |
| ES-4 | X-4 | R-4 | Solid |

TABLE 1-continued

| | Aliphatic ester compound shown by Formula 1 | | |
|---|---|---|---|
| Dispersoid | $X^1$ | $R^1$ | Condition at 25° |
| es-1 | x-1 | R-5 | Solid |
| es-2 | x-2 | R-6 | Liquid |

TABLE 2

| | Aliphatic ester compound shown by Formula 2 | | | |
|---|---|---|---|---|
| Dispersoid | $X^2$ | $X^3$ | A | Condition at 25° |
| ES-5 | X-1 | X-1 | A-1 | Solid |
| ES-6 | X-5 | X-5 | A-2 | Solid |
| ES-7 | X-6 | X-6 | A-3 | Solid |
| ES-8 | X-1 | X-1 | A-3 | Solid |
| ES-9 | X-3 | X-3 | A-3 | Solid |
| ES-10 | X-1 | X-1 | A-4 | Solid |
| es-3 | X-4 | X-4 | A-1 | Solid |
| es-4 | x-1 | x-1 | A-4 | Solid |
| es-5 | x-2 | x-2 | A-4 | Solid |
| es-6 | x-2 | x-2 | A-2 | Liquid |

TABLE 3

| | Aliphatic ester compound shown by Formula 3 | | | |
|---|---|---|---|---|
| Dispersoid | $X^4$ | $X^5$ | $X^6$ | Condition at 25° |
| ES-11 | X-1 | X-1 | X-1 | Solid |
| ES-12 | X-7 | X-7 | X-7 | Solid |
| ES-13 | X-5 | X-5 | X-5 | Solid |
| ES-14 | X-1 | X-8 | Hydrogen atom | Solid |
| ES-15 | X-4 | X-4 | X-4 | Solid |
| ES-16 | X-9 | X-9 | X-9 | Solid |
| es-7 | x-3 | x-3 | x-3 | Liquid |

TABLE 4

| | Aliphatic ester compound shown by Formula 4 | | | | |
|---|---|---|---|---|---|
| Dispersoid | $X^7$ | $X^8$ | $X^9$ | $X^{10}$ | Condition at 25° |
| ES-17 | X-5 | X-5 | X-5 | X-5 | Solid |
| ES-18 | X-1 | X-1 | X-1 | X-1 | Solid |
| ES-19 | X-9 | X-9 | X-9 | X-9 | Solid |
| ES-20 | X-10 | X-10 | X-10 | X-10 | Solid |
| ES-21 | X-11 | X-11 | X-11 | X-11 | Solid |
| es-8 | x-3 | x-3 | x-3 | x-3 | Liquid |

In Tables 1-4:
R-1: Residual group obtained by removing hydroxy groups from octacosanol (octacosyl group);
R-2: Residual group obtained by removing hydroxy groups from tetracosanol (tetracosyl group);
R-3: Residual group obtained by removing hydroxy groups from octadecanol (octadecyl group);
R-4: Residual group obtained by removing hydroxy groups from hexadecanol (hexadecyl group);
R-5: Residual group obtained by removing hydroxy groups from dodecanol (dodecyl group);
R-6: Residual group obtained by removing hydroxy groups from methanol (methyl group);
X-1: Residual group obtained by removing hydroxy groups from carboxyl group of montanac acid ($R^2$: heptacosyl group);
X-2: Residual group obtained by removing hydroxy groups from carboxyl group of isocerotic acid ($R^2$: 3-methyltetracosyl group);
X-3: Residual group obtained by removing hydroxy groups from carboxyl group of arakinic acid ($R^2$: nonadecyl group);
X-4: Residual group obtained by removing hydroxy groups from carboxyl group of palmitic acid ($R^2$: pentadecyl group);
X-5: Residual group obtained by removing hydroxy groups from carboxyl group of dotriacontanic acid ($R^2$: hentriacontyl group);
X-6: Residual group obtained by removing hydroxy groups from carboxyl group of behenic acid ($R^2$: henicosyl group);
X-7: Residual group obtained by removing hydroxy groups from carboxyl group of lignoceric acid ($R^2$: tetracosyl group);
X-8: Residual group obtained by removing hydroxy groups from carboxyl group of cerotic acid ($R^2$: pentacosyl group);
X-9: Residual group obtained by removing hydroxy groups from carboxyl group of stearic acid ($R^2$: heptadecyl group);
X-10: Residual group obtained by removing hydroxy groups from carboxyl group of cyclohexanic acid ($R^2$: cyclohexyl group);
X-11: Residual group obtained by removing hydroxy groups from carboxyl group of dotetracontanic acid ($R^2$: hentetracontyl group);
x-1: Residual group obtained by removing hydroxy groups from carboxyl group of tetrapentacontanic acid ($R^2$: tripentacontyl group);
x-2: Residual group obtained by removing hydroxy groups from carboxyl group of lauric acid ($R^2$: undecyl group);
x-3: Residual group obtained by removing hydroxy groups from carboxyl group of octanic acid ($R^2$: heptyl group);
A-1: Residual group obtained by removing all hydroxy groups from 1,4-butanediol;
A-2: Residual group obtained by removing all hydroxy groups from 1,2-propanediol;
A-3: Residual group obtained by removing all hydroxy groups from ethylene glycol;
A-4: Residual group obtained by removing all hydroxy groups from polyethylene glycol with molecular weight of 400.

Part 2 (Preparation of Agents for Processing Polyurethane Elastomer Fibers)

Test Example 1

Preparation of Agent (T-1) for Processing Polyurethane Elastomer Fibers

After 98 parts of mineral oil with viscosity of $20 \times 10^{-6}$ m$^2$/s at 25° C. as disperse medium and 2 parts of aliphatic ester compound (ES-5) shown in Table 2 as dispersoid were mixed at 20-35° C. until they became uniform, a horizontal beads mill was used for wet grinding to produce agent (T-1) for processing polyurethane elastomer fibers corresponding to Test Example 1 as a uniformly dispersed liquid with the dispersoid having an average particle size of 5 μm as measured by the measurement method described above.

Test Examples 2-8, 17-19 and 24 and Comparison Examples 5, 6 and 8

Preparation of Agents (T-2)-(T-8), (T-17)-(T-19) and (T-24) for Processing Polyurethane Elastomer Fibers and Agents (t-5), (t-6) and (t-8) for Comparison Agents (T-2)-(T-8), (T-17)-(T-19), (T-24), (t-5), (t-6) and (t-8), shown in Table 5, corresponding to Test Examples 2-8, 17-19 and 24 and Comparison Examples 5, 6 and 8 were prepared similarly to agent (T-1) of Test Example 1.

Test Example 9

Preparation of Agent (T-9) for Processing Polyurethane Elastomer Fibers

After 88.2 parts of mineral oil with viscosity of $20 \times 10^{-6}$ m$^2$/s at 25° C. and 9.8 parts of polydimethyl siloxane with viscosity of $20 \times 10^{-6}$ m$^2$/s at 25° C. as disperse medium and 2 parts of aliphatic ester compound (ES-5) shown in Table 2 as dispersoid were mixed at 20-35° C. until they became uniform, a horizontal beads mill was used for wet grinding to produce agent (T-9) for processing polyurethane elastomer fibers corresponding to Test Example 9 as a uniformly dispersed liquid with the dispersoid having an average particle size of 5 µm as measured by the measurement method described above.

Test Examples 10-12 and 20 and Comparison Examples 3 and 4

Preparation of Agents (T-10)-(T-12) and (T-20) for Processing Polyurethane Elastomer Fibers and Agents (t-3) and (t-4) for Comparison Agents (T-10)-(T-12), (T-20), (t-3) and (t-4), shown in Table 5, corresponding to Test Examples 10-12 and 20 and Comparison Examples 3 and 4 were prepared similarly to agent (T-9) of Test Example 9.

Test Example 13

Preparation of Agent (T-13) for Processing Polyurethane Elastomer Fibers

After 98 parts of mineral oil with viscosity of $20 \times 10^{-6}$ m$^2$/s at 25° C. as disperse medium and 0.8 parts of aliphatic ester compound (ES-17) shown in Table 4 and 1.2 parts of aliphatic ester compound (ES-8) as dispersoid were mixed at 20-35° C. until they became uniform, a horizontal beads mill was used for wet grinding to produce agent (T-13) for processing polyurethane elastomer fibers corresponding to Test Example 13 as a uniformly dispersed liquid with the dispersoid having an average particle size of 70 µm as measured by the measurement method described above.

Test Examples 14-16

Preparation of Agents (T-14)-(T-16) for Processing Polyurethane Elastomer Fibers Agents (T-14)-(T-16), shown in Table 5, corresponding to Test Examples 14-16 were prepared similarly to agent (T-13) of Test Example 13.

Test Example 21

Preparation of Agent (T-21) for Processing Polyurethane Elastomer Fibers

After 88.2 parts of mineral oil with viscosity of $20 \times 10^{-6}$ m$^2$/s at 25° C. and 9.8 parts of polydimethyl siloxane with viscosity of $20 \times 10^{-6}$ m$^2$/s at 25° C. as disperse medium and 0.8 parts of aliphatic ester compound (ES-3) shown in Table 1 and 1.2 parts of aliphatic ester compound (ES-9) shown in Table 2 as dispersoid were mixed at 20-35° C. until they became uniform, a horizontal beads mill was used for wet grinding to produce agent (T-21) for processing polyurethane elastomer fibers corresponding to Test Example 21 as a uniformly dispersed liquid with the dispersoid having an average particle size of 5 µm as measured by the measurement method described above.

Test Example 22

Preparation of Agent (T-22) for Processing Polyurethane Elastomer Fibers

After 98 parts of mineral oil with viscosity of $150 \times 10^{-6}$ m$^2$/s at 25° C. as disperse medium and 2 parts of aliphatic ester compound (ES-10) shown in Table 2 as dispersoid were mixed at 20-35° C. until they became uniform, a horizontal beads mill was used for wet grinding to produce agent (T-22) for processing polyurethane elastomer fibers corresponding to Test Example 22 as a uniformly dispersed liquid with the dispersoid having an average particle size of 5 µm as measured by the measurement method described above. At the time of actual application, one part of polyether modified polydimethyl siloxane was used together with 100 parts of the agent (T-22) prepared as above. This polyether modified polydimethyl siloxane was structured at the mass ratio of (polydimethyl siloxane portion)/(polyoxyalkylene group portion)=90/10 with the polyoxyalkylene group portion being structured at the mass ratio of (oxyethylene unit)/(oxypropylene unit)=75/25.

Test Example 23

Preparation of Agent (T-23) for Processing Polyurethane Elastomer Fibers

After 83.6 parts of mineral oil with viscosity of $80 \times 10^{-6}$ m$^2$/s at 25° C. and 4.4 parts of isotridecyl stearate as disperse medium and 6 parts of aliphatic ester compound (ES-16) shown in Table 3 and 6 parts of aliphatic ester compound (ES-19) shown in Table 4 as dispersoid were mixed at 20-35° C. until they became uniform, a horizontal beads mill was used for wet grinding to produce agent (T-23) for processing polyurethane elastomer fibers corresponding to Test Example 23 as a uniformly dispersed liquid with the dispersoid having an average particle size of 50 µm as measured by the measurement method described above. At the time of actual application, one part of silicone resin was used together with 100 parts of the agent (T-23) prepared as above. This silicone resin was a result of condensation polymerization at the molar ratio of (hexamethyl disiloxane)/(tetramethoxy silane)=1/2.

Test Example 25

Preparation of Agent (T-25) for Processing Polyurethane Elastomer Fibers

After 83.3 parts of mineral oil with viscosity of $20 \times 10^{-6}$ m$^2$/s at 25° C., 9.8 parts of polydimethyl siloxane with viscosity of $20 \times 10^{-6}$ m$^2$/s at 25° C. and 4.9 parts of trimethylol propane trilaurate as disperse medium and 2 parts of aliphatic ester compound (ES-4) shown in Table 1 as dispersoid were mixed at 20-35° C. until they became uniform, a horizontal beads mill was used for wet grinding to produce agent (T-25) for processing polyurethane elastomer fibers corresponding to Test Example 25 as a uniformly dispersed liquid with the

Test Example 26

Preparation of Agent (T-26) for Processing Polyurethane Elastomer Fibers

After 85 parts of mineral oil with viscosity of $20\times10^{-6}$ m$^2$/s at 25° C. as disperse medium and 15 parts of aliphatic ester compound (ES-21) shown in Table 4 as dispersoid were mixed at 20-35° C. until they became uniform, a horizontal beads mill was used for wet grinding to produce agent (T-26) for processing polyurethane elastomer fibers corresponding to Test Example 26 as a uniformly dispersed liquid with the dispersoid having an average particle size of 5 μm as measured by the measurement method described above. At the time of actual application, one part of amino modified polydimethyl siloxane was used together with 100 parts of the agent (T-26) prepared as above. The amino equivalent of this amino modified polydimethyl siloxane was 2000 and its viscosity was 200 m$^2$/s at 25° C.

Comparison Example 1

Preparation of Agent (t-1) for Processing Polyurethane Elastomer Fibers

After 19.6 parts of mineral oil with viscosity of $20\times10^{-6}$ m$^2$/s at 25° C. and 78.4 parts of polydimethyl siloxane with viscosity of $20\times10^{-6}$ m$^2$/s at 25° C. as disperse medium and 2 parts of stearic acid magnesium salt as dispersoid were mixed at 20-35° C. until they became uniform, a horizontal beads mill was used for wet grinding to produce agent (t-1) for processing polyurethane elastomer fibers corresponding to Comparison Example 1 as a uniformly dispersed liquid with the dispersoid having an average particle size of 2 μm as measured by the measurement method described above. At the time of actual application, 2 parts of polyether modified polydimethyl siloxane were used together with 100 parts of the agent (t-1) prepared as above. This polyether modified polydimethyl siloxane was structured at the mass ratio of (polydimethyl siloxane portion)/(polyoxyalkylene group portion)=90/10 with the polyoxyalkylene group portion being structured at the mass ratio of (oxyethylene unit)/(oxypropylene unit)=75/25.

Comparison Example 2

Preparation of Agent (t-2) for Processing Polyurethane Elastomer Fibers

After 99 parts of mineral oil with viscosity of $20\times10^{-6}$ m$^2$/s at 25° C. as disperse medium and 1 part of stearic acid magnesium salt as dispersoid were mixed at 20-35° C. until they became uniform, a horizontal beads mill was used for wet grinding to produce agent (t-2) for processing polyurethane elastomer fibers corresponding to Comparison Example 2 as a uniformly dispersed liquid with the dispersoid having an average particle size of 2 μm as measured by the measurement method described above.

Comparison Example 7

Preparation of Agent (t-7) for Processing Polyurethane Elastomer Fibers

Mineral oil with viscosity of $10\times10^{-6}$ m$^2$/s at 25° C. was used as agent (t-7) for processing polyurethane elastomer fibers corresponding to Comparison Example 7.

Comparison Examples 9-20

Preparation of Agents (t-9)-(t-20) for Processing Polyurethane Elastomer Fibers The average particle size, viscosity of the disperse medium and the conditions of the dispersoid were varied to prepare agents (t-9)-(t-20) corresponding to Comparison Examples 9-20.

Details of the agents for processing urethane elastomer fibers as described above are summarized in Tables 5 and 6.

TABLE 5

| | | Agent for processing polyurethane elastomer fibers | | | | | | |
|---|---|---|---|---|---|---|---|---|
| | | Disperse medium | | | | | | |
| | | (a) | (b) | | | | | |
| Test Ex. | Type | Mineral oil Type/Rate | Silicone oil Type/Rate | Liquid ester oil Type/Rate | (a)/(b) (%) | Vis | Amt | D'soid Type/amt | APD (μm) |
| 1 | T-1 | a-1/100 | —/— | —/— | 100/0 | 20 | 98 | ES-5/2 | 5 |
| 2 | T-2 | a-1/100 | —/— | —/— | 100/0 | 20 | 98 | ES-6/2 | 40 |
| 3 | T-3 | a-2/100 | —/— | —/— | 100/0 | 5 | 98 | ES-7/2 | 8 |
| 4 | T-4 | a-3/100 | —/— | —/— | 100/0 | 10 | 96 | ES-8/4 | 20 |
| 5 | T-5 | a-1/100 | —/— | —/— | 100/0 | 20 | 98 | ES-11/2 | 20 |
| 6 | T-6 | a-4/100 | —/— | —/— | 100/0 | 30 | 98 | ES-12/2 | 70 |
| 7 | T-7 | a-1/100 | —/— | —/— | 100/0 | 20 | 99 | ES-13/1 | 1 |
| 8 | T-8 | a-1/100 | —/— | —/— | 100/0 | 20 | 96 | ES-14/4 | 5 |
| 9 | T-9 | a-1/90 | b-1/10 | —/— | 90/10 | 20 | 98 | ES-5/2 | 5 |
| 10 | T-10 | a-3/90 | b-2/10 | —/— | 90/10 | 10 | 98 | ES-7/2 | 40 |
| 11 | T-11 | a-1/90 | b-1/10 | —/— | 90/10 | 20 | 98 | ES-11/2 | 5 |
| 12 | T-12 | a-4/90 | b-3/10 | —/— | 90/10 | 30 | 98 | ES-14/2 | 20 |
| 13 | T-13 | a-1/100 | —/— | —/— | 100/0 | 20 | 98 | ES-17/0.8 ES-8/1.2 | 70 |
| 14 | T-14 | a-1/100 | —/— | —/— | 100/0 | 20 | 98 | ES-1/0.8 ES-5/1.2 | 5 |
| 15 | T-15 | a-1/100 | —/— | —/— | 100/0 | 20 | 99 | ES-1/0.5 ES-12/0.5 | 1 |
| 16 | T-16 | a-1/100 | —/— | —/— | 100/0 | 20 | 98 | ES-18/0.6 ES-11/1.4 | 20 |

TABLE 5-continued

Agent for processing polyurethane elastomer fibers

| | | Disperse medium | | | | | | | |
|---|---|---|---|---|---|---|---|---|---|
| | | (a) | (b) | | | | | | |
| Test Ex. | Type | Mineral oil Type/Rate | Silicone oil Type/Rate | Liquid ester oil Type/Rate | (a)/(b) (%) | Vis | Amt | D'soid Type/amt | APD (μm) |
| 17 | T-17 | a-1/100 | —/— | —/— | 100/0 | 20 | 98 | ES-9/2 | 5 |
| 18 | T-18 | a-1/100 | —/— | —/— | 100/0 | 20 | 99.5 | ES-2/0.5 | 5 |
| 19 | T-19 | a-1/100 | —/— | —/— | 100/0 | 20 | 98 | ES-15/2 | 5 |
| 20 | T-20 | a-1/75 | b-1/25 | —/— | 75/25 | 20 | 98 | ES-11/2 | 30 |
| 21 | T-21 | a-1/90 | b-1/10 | —/— | 90/10 | 20 | 98 | ES-3/0.8 ES-9/1.2 | 5 |
| 22 | T-22 | a-5/100 | —/— | —/— | 100/0 | 150 | 98 | ES-10/2 | 5 |
| 23 | T-23 | a-7/95 | —/— | c-1/5 | 100/0 | 77 | 88 | ES-16/6 ES-19/6 | 50 |
| 24 | T-24 | a-1/100 | —/— | —/— | 100/0 | 20 | 98 | ES-20/2 | 120 |
| 25 | T-25 | a-1/85 | b-1/10 | c-2/5 | 90/10 | 19 | 98 | ES-4/2 | 5 |
| 26 | T-26 | a-1/100 | —/— | —/— | 100/0 | 20 | 85 | ES-21/15 | 5 |

TABLE 6

Agent for processing polyurethane elastomer fibers

| | | Disperse medium | | | | | | | |
|---|---|---|---|---|---|---|---|---|---|
| | | (a) | (b) | | | | | | |
| Cmp Ex. | Type | Mineral oil Type/Rate | Silicone oil Type/Rate | Liquid ester oil Type/Rate | (a)/(b) (%) | Vis | Amt | D'soid Type/amt | APD (μm) |
| 1 | t-1 | a-1/20 | b-1/80 | —/— | 20/80 | 20 | 98 | *1/2 | 2 |
| 2 | t-2 | a-1/100 | —/— | —/— | 100/0 | 20 | 99 | *1/1 | 2 |
| 3 | t-3 | a-6/50 | b-4/50 | —/— | 50/50 | 500 | 70 | es-1/30 | 100 |
| 4 | t-4 | a-1/20 | b-1/20 | —/— | 20/80 | 20 | 98 | es-3/2 | 10 |
| 5 | t-5 | a-1/100 | —/— | —/— | 100/0 | 20 | 98 | es-4/2 | 700 |
| 6 | t-6 | a-8/100 | —/— | —/— | 100/0 | 2000 | 70 | ES-5/30 | 5 |
| 7 | t-7 | a-3/100 | —/— | —/— | 100/0 | 10 | 100 | —/— | — |
| 8 | t-8 | a-1/100 | —/— | —/— | 100/0 | 20 | 98 | es-5/2 | 5 |
| 9 | t-9 | a-8/100 | —/— | —/— | 100/0 | 2000 | 98 | ES-3/2 | 5 |
| 10 | t-10 | a-8/100 | —/— | —/— | 100/0 | 2000 | 98 | ES-9/2 | 20 |
| 11 | t-11 | a-8/100 | —/— | —/— | 100/0 | 2000 | 98 | ES-16/2 | 20 |
| 12 | t-12 | a-8/100 | —/— | —/— | 100/0 | 2000 | 98 | ES-19/2 | 5 |
| 13 | t-13 | a-1/100 | —/— | —/— | 100/0 | 20 | 98 | ES-3/2 | 900 |
| 14 | t-14 | a-1/100 | —/— | —/— | 100/0 | 20 | 98 | ES-9/2 | 700 |
| 15 | t-15 | a-1/100 | —/— | —/— | 100/0 | 20 | 98 | ES-16/2 | 600 |
| 16 | t-16 | a-1/100 | —/— | —/— | 100/0 | 20 | 98 | ES-19/2 | 700 |
| 17 | t-17 | a-1/100 | —/— | —/— | 100/0 | 20 | 98 | es-2/2 | — |
| 18 | t-18 | a-1/100 | —/— | —/— | 100/0 | 20 | 98 | es-6/2 | — |
| 19 | t-19 | a-1/100 | —/— | —/— | 100/0 | 20 | 98 | es-7/2 | — |
| 20 | t-20 | a-1/100 | —/— | —/— | 100/0 | 20 | 98 | es-8/2 | — |

In Tables 5 and 6:
Test Ex: Test Example
Cmp Ex: Comparison Example
Rate and Amt (amount) in units of parts
Vis: Viscosity in units of $10^{-6}$ m/s
D'soid: Dispersoid
APD: Average particle size=the value (in units of μm) as measured by the measuring method described above
a-1: Mineral oil with viscosity of $20\times10^{-6}$ m$^2$/s at 25° C.
a-2: Mineral oil with viscosity of $5\times10^{-6}$ m$^2$/s at 25° C.
a-3: Mineral oil with viscosity of $10\times10^{-6}$ m$^2$/s at 25° C.
a-4: Mineral oil with viscosity of $30\times10^{-6}$ m$^2$/s at 25° C.
a-5: Mineral oil with viscosity of $150\times10^{-6}$ m$^2$/s at 25° C.
a-6: Mineral oil with viscosity of $500\times10^{-6}$ m$^2$/s at 25° C.
a-7: Mineral oil with viscosity of $80\times10^{-6}$ m$^2$/s at 25° C.
a-8: Mineral oil with viscosity of $2000\times10^{-6}$ m$^2$/s at 25° C.
b-1: Polydimethyl siloxane with viscosity of $20\times10^{-6}$ m$^2$/s at 25° C.
b-2: Polydimethyl siloxane with viscosity of $10\times10^{-6}$ m$^2$/s at 25° C.
b-3: Polydimethyl siloxane with viscosity of $30\times10^{-6}$ m$^2$/s at 25° C.
b-4: Polydimethyl siloxane with viscosity of $500\times10^{-6}$ m$^2$/s at 25° C.
c-1: Isotridecyl stearate
c-2: Trimethylol propane trilaurate
*1: Stearic acid magnesium salt Part 3 (Evaluation of Agents for Processing Urethane Elastomer Fibers)

The agents for processing urethane elastomer fibers prepared as described in Part 2 were evaluated with regard to dispersion stability, average particle size and viscosity increase. The results of the evaluation are shown in Tables 7 and 8.

Evaluation of Dispersion Stability

Each of the examples of agent for processing urethane elastomer fibers was placed in an amount of 100 ml in a 100 ml glass measuring cylinder equipped with a sealing plug and its appearance was observed and evaluated according to the following standards both immediately after its preparation and after it has been left for 6 months at 25° C.:

A: Uniformly dispersed condition without any change in appearance;
  B: A transparent layer of less than 5 ml has been generated;
  C: A transparent layer of 5 ml or more has been generated;
  D: Precipitation has occurred.

Evaluation of Average Particle Size

The average particle size of the dispersoid was measured by the measurement method described above for each of the examples of agent for processing urethane elastomer fibers on which dispersion stability was evaluated immediately after the preparation and six months later and evaluated according to the following standards:

D: Average particle size is less than 0.01 μm;
B: Average particle size is 0.01 μm or greater and less than 0.1 μm;
A: Average particle size is 0.1 μm or greater and 100 μm or less;
B: Average particle size is greater than 100 μm and 500 μm or less
D: Average particle size is greater than 500 μm.

Evaluation of Increase in Viscosity

An E-type viscometer (Type DVH-E, produced by TOKIMEC Corporation) was used to measure the initial viscosity $V_1$ (Pa·s) at 25° C. of each of the examples of agent for processing urethane elastomer fibers immediately after it was prepared at rotor E, 20 rpm. Each of the examples of agent for processing urethane elastomer fibers was also placed in a glass container with a sealed plug and its sequential viscosity $V_2$ (Pa·s) at 30° C. was also measured after it was left for 6 months at 40° C. The ratio $V_2/V_1$ was calculated and evaluated according to the following standards:

A: $V_2/V_1$ is less than 1.3;
B: $V_2/V_1$ is 1.3 or greater and less than 1.5;
C: $V_2/V_1$ is 1.5 or greater and less than 2.0;
D: $V_2/V_1$ is greater than 2.0.

TABLE 7

Agent for processing polyurethane elastomer fibers

| Test Example | Type | Dispersion stability Immediately after preparation | Dispersion stability 6 months later | Average particle size Immediately after preparation | Average particle size 6 months later | Viscosity increase |
|---|---|---|---|---|---|---|
| 1 | T-1 | A | A | A | A | A |
| 2 | T-2 | A | A | A | A | A |
| 3 | T-3 | A | A | A | A | A |
| 4 | T-4 | A | A | A | A | A |
| 5 | T-5 | A | A | A | A | A |
| 6 | T-6 | A | A | A | A | A |
| 7 | T-7 | A | A | A | A | A |
| 8 | T-8 | A | A | A | A | A |
| 9 | T-9 | A | A | A | A | A |
| 10 | T-10 | A | A | A | A | A |
| 11 | T-11 | A | A | A | A | A |
| 12 | T-12 | A | A | A | A | A |
| 13 | T-13 | A | B | A | B | A |
| 14 | T-14 | A | B | A | B | A |
| 15 | T-15 | A | B | A | B | A |
| 16 | T-16 | A | B | A | B | A |
| 17 | T-17 | A | B | A | B | A |
| 18 | T-18 | B | B | A | A | A |
| 19 | T-19 | B | B | A | A | B |
| 20 | T-20 | A | A | A | A | A |
| 21 | T-21 | B | B | A | A | A |
| 22 | T-22 | B | B | A | B | B |
| 23 | T-23 | B | B | A | B | B |
| 24 | T-24 | B | B | B | B | B |
| 25 | T-25 | B | B | A | B | B |
| 26 | T-26 | B | B | A | A | A |

TABLE 8

Agent for processing polyurethane elastomer fibers

| Comparison Example | Type | Dispersion stability Immediately after preparation | Dispersion stability 6 months later | Average particle size Immediately after preparation | Average particle size 6 months later | Viscosity increase |
|---|---|---|---|---|---|---|
| 1 | t-1 | B | B | A | B | C |
| 2 | t-2 | D | D | A | D | D |
| 3 | t-3 | B | B | A | B | B |
| 4 | t-4 | B | B | A | B | B |
| 5 | t-5 | C | D | D | D | C |
| 6 | t-6 | A | B | A | B | C |
| 7 | t-7 | *2 | *2 | *2 | *2 | A |
| 8 | t-8 | D | D | B | D | D |
| 9 | t-9 | A | B | A | A | B |
| 10 | t-10 | A | B | A | A | B |
| 11 | t-11 | A | B | A | A | B |
| 12 | t-12 | A | B | A | A | B |
| 13 | t-13 | C | D | D | D | C |
| 14 | t-14 | C | D | D | D | C |
| 15 | t-15 | C | D | D | D | C |
| 16 | t-16 | C | D | D | D | C |
| 17 | t-17 | *2 | *2 | *2 | *2 | A |
| 18 | t-18 | *2 | *2 | *2 | *2 | A |
| 19 | t-19 | *2 | *2 | *2 | *2 | A |
| 20 | t-20 | *2 | *2 | *2 | *2 | A |

In Tables 7 and 8:
*2: Evaluation could not be made because it was not a dispersed liquid.

As can be clearly understood from the results shown in Tables 7 and 8, the agents of this invention can maintain their initial conditions for an extended period of time and superior in the dispersion stability. The agents of this invention undergo hardly any changes in their property over a long period of storage or during transportation, maintaining their superior dispersion stability, and hence are extremely useful.

Part 4 (Adhesion of the Agents to Urethane Elastomer Fibers and Evaluation)

Adhesion of the Agents for Processing Urethane Elastomer Fibers to Urethane Elastomer Fibers After mixture {bis-(p-isocyanate phenyl)-methane}/{tetramethylene etherglycol (numerical molecular weight=

1800)}=1.58/1 (molar ratio) was caused to react for 3 hours at 90° C. for an ordinary method to obtain urethane polymer terminated by glycols, this urethane polymer terminated by glycols was diluted by N,N'-dimethylacetoamide (hereinafter DMAc). Next, a DMAc solution containing ethylene diamine and diethylamine was added to the aforementioned DMAc solution of urethane polymer terminated by glycols, and polymer was obtained by using a high-speed stirring device at a room temperature to elongate the chain. DMAc was further added to obtain a DMAc solution with the concentration of the aforementioned polymer of about 35% by mass. To the DMAc solution of this polymer, titanium oxide, hindered amine weather resisting agent and hindered phenol antioxidant were added such that they would respectively be 4.7%, 3.0% and 1.2% by mass and were mixed so as to obtain a uniform solution. This polymer mixture liquid was used to spin elastic yarns of 560 dtex with a filament count of 56 by using a dry spinning method commonly used for Spandex and each example of agent for processing urethane elastomer fibers in the condition of neat was directly supplied for roller oiling from an oiling roller before they were wound up. A package of dry spun polyurethane elastomer fibers was obtained by winding up around a cylindrical paper tube with a length of 115 mm the fibers thus subjected to an roller oiling process at a wind-up speed of 500 m/minute through a traverse guide providing a width of 104 mm by using a surface driven winding device. The adhered amount of the agent for processing polyurethane elastomer fibers was controlled by adjusting the rotational speed of the oiling roller.

Measurement and Evaluation

The packages of dry spun polyurethane elastomer fibers thus obtained were measured and evaluated as described below. The results are shown in Tables 9 and 10.

Adhered Amount

Measurements were made on urethane elastomer fibers pulled out of each of the aforementioned packages (1 kg rolls) according to JIS-L1073 (test method for synthetic fiber filaments) by using n-hexane as solvent for extraction.

Evaluation of Roll Shape

The maximum and minimum values of the width ($W_{max}$ and $W_{min}$) of winding were measured on each of the aforementioned packages (1 kg rolls), the bulge was obtained from their difference ($W_{max}-W_{min}$) and it was evaluated according to the following standards:

A: Bulge was less than 4 mm;
B: Bulge was 4-6 mm;
C: Bulge was 6-7 mm;
D: Bulge exceeded 7 mm.

Evaluation of Unwinding Property

A feeding part was formed on one side with a first driver roller and a first free roller which always remains in contact therewith, a winding part was formed on the other side with a second driver roller and a second free roller which always remains in contact therewith and they were set horizontally apart by 20 cm. A package (3 kg roll) similar to the above was set on the first driver roller and was unwound until the reel thickness became 2 mm by winding up with the second driver roller. While the feeding speed of the urethane elastomer fibers from the first driver roller was fixed to 50 m/minute, the wind-up speed of the urethane elastomer fibers onto the second driver roller was gradually increased from 50 m/minute for forcibly unwinding the urethane elastomer fibers from the package. During the time of this forcible unwinding, the wind-up speed V (in m/minute) at the moment when the slip of the urethane elastomer fibers between the feeding and winding parts disappears was measured and the unwinding property (%) was calculated as (V-50)×2 and evaluated according to the following standards:

A: Unwinding property is less than 120% (no problem, allowing safe unwinding);
B: Unwinding property is 120% or greater and less than 160% (some resistance in pulling but no occurrence of breakage, allowing safe unwinding);
C: Unwinding property is 160% or greater and less than 200% (presence of resistance in pulling and presence of some breakage and problems in workability);
D: Unwinding property is greater than 200% (large resistance in pulling and frequent occurrence of breakage with problems in workability).

Unwinding property was similarly evaluated also after packages were left for 6 months at 25° C.

Evaluation of Smoothness

A friction meter (SAMPLE FRICTION UNIT MODEL TB-1 produced by Eiko Sokki Co., Ltd.) was used with a rough pin plated with chromium of diameter 1 cm and surface roughness 2S placed between free rollers, and the contact angle of the urethane elastomer fibers pulled out from the aforementioned package (1 kg roll) was arranged to be 90°. An initial tension ($T_1$) of 5 g was applied on the inlet side under the conditions of 25° C. and 60% RH and the secondary tension ($T_2$) on the outlet side was measured when they were run at the speed of 100 m/minute. Coefficient of friction was obtained as $(2/3.14) \times \ln(T_2/T_1)$ and evaluated according to the following standards:

A: Coefficient of friction is 0.150 or greater and less than 0.220;
B: Coefficient of friction is 0.220 or greater and less than 0.260;
C: Coefficient of friction is 0.260 or greater and less than 0.300;
D: Coefficient of friction is 0.300 or greater.

Evaluation of Antistatic Property

When smoothness was evaluated as described above, a static potential sensor (KSD-0103 produced by Kasuga Electric Works Ltd.) was placed at a position 1 cm below the rough pin plated with chromium and the generated electricity was measured and evaluated according to the following standards:

A: Generated electricity is less than 50 volts (no problem at all, allowing safe operation);
B: Generated electricity is 50 volts or greater and less than 100 volts (safe operation possible without problems in spite of some displacements in yarn regulating process);
C: Generated electricity is 100 volts or greater and less than 500 volts (operation possible in spite of displacements in yarn regulating process and presence of problems);
D: Generated electricity is 500 volts or greater (operation not possible with significant displacements in yarn regulating process and significant attachment of wind-generated cotton during circular knitting process).

Evaluation of Adhesion Property

A rubber hot melt adhesive having styrene butadiene styrene block copolymer as principal component heated to 145° C. to be melted was uniformly applied by a roller onto a spunbond non-woven fabric of polypropylene, and it was cut to obtain two 40 mm×20 mm cut pieces. A 10 mm end part of urethane elastomer fibers of 40 mm in length pulled out of the aforementioned package (1 kg roll) was inserted between the coated surfaces of these two pieces and after it was compressed at a processing temperature of 160° C. with a load of 9 g/cm$^2$ for 30 seconds to prepare a sample. The spunbond non-woven fabric portion of polypropylene of this sample was fastened to an upper sample holding part of a tensile tester (Autograph AGS produced by Shimadzu Corporation) while urethane elastomer fibers was fastened to its lower sample holding part and was pulled at a speed of 100 mm/minute. The force required to pull the urethane elastomer fibers from the spunbond non-woven fabric of polypropylene was measured and evaluated according to the following standards:

A: Required force is 35 g or greater (strong hot melt adhesion allowing safe operation);

B: Required force is 30 g or greater and less than 35 g (practical hot melt adhesion with no problem occurring in operation);

C: Required force is 25 g or greater and less than 30 g (some problems with hot melt adhesion, problems occurring sometimes in operation);

D: Required force is less than 25 g (weak hot melt adhesion with significant problems in operation).

TABLE 9

| Test Example | Type | Adhered amount (%) | Roll shape | Unwinding property | Unwinding property 6 months later | Smoothness | Antistatic property | Adhesive property |
|---|---|---|---|---|---|---|---|---|
| 27 | T-1 | 5 | A | A | A | A | A | A |
| 28 | T-2 | 5 | A | A | A | A | A | A |
| 29 | T-3 | 5 | A | A | A | A | A | A |
| 30 | T-4 | 5 | A | A | A | A | A | A |
| 31 | T-5 | 5 | A | A | A | A | A | A |
| 32 | T-6 | 5 | A | A | A | A | A | A |
| 33 | T-7 | 5 | A | A | A | A | A | A |
| 34 | T-8 | 3 | A | A | A | A | A | A |
| 35 | T-9 | 5 | A | A | A | A | A | B |
| 36 | T-10 | 3 | A | A | A | A | A | B |
| 37 | T-11 | 5 | A | A | A | A | A | B |
| 38 | T-12 | 5 | A | A | A | A | A | B |
| 39 | T-13 | 5 | A | A | B | A | A | A |
| 40 | T-14 | 5 | A | A | B | A | A | A |
| 41 | T-15 | 5 | A | A | B | A | A | A |
| 42 | T-16 | 5 | A | A | B | A | A | A |
| 43 | T-17 | 8 | A | A | B | A | A | B |
| 44 | T-18 | 5 | A | B | B | A | A | A |
| 45 | T-19 | 5 | A | B | B | A | A | A |
| 46 | T-20 | 5 | B | A | A | A | A | B |
| 47 | T-21 | 5 | A | B | B | B | A | B |
| 48 | T-22 | 5 | A | B | B | B | A | B |
| 49 | T-23 | 5 | B | B | B | B | A | A |
| 50 | T-24 | 5 | B | B | B | B | B | B |
| 51 | T-25 | 10 | B | B | B | B | B | B |
| 52 | T-26 | 0.5 | B | B | B | B | B | B |

TABLE 10

| Comp. Example | Type | Adhered amount (%) | Roll shape | Unwinding property | Unwinding property 6 months later | Smoothness | Antistatic property | Adhesive property |
|---|---|---|---|---|---|---|---|---|
| 21 | t-1 | 5 | C | B | B | A | C | D |
| 22 | t-2 | 5 | B | D | D | D | B | C |
| 23 | t-3 | 5 | B | B | B | D | B | D |
| 24 | t-4 | 5 | C | B | B | A | C | D |
| 25 | t-5 | 5 | C | C | D | B | B | B |
| 26 | t-6 | 12 | D | A | B | D | B | D |
| 27 | t-7 | 5 | B | D | D | C | D | B |
| 28 | t-8 | 5 | B | D | D | B | B | B |
| 29 | t-9 | 5 | D | B | B | D | B | D |
| 30 | t-10 | 5 | D | B | B | D | B | D |
| 31 | t-11 | 5 | D | B | B | D | B | D |
| 32 | t-12 | 5 | D | B | B | D | B | D |
| 33 | t-13 | 5 | C | C | D | B | B | B |
| 34 | t-14 | 5 | C | C | D | B | B | B |
| 35 | t-15 | 5 | C | C | D | B | B | B |
| 36 | t-16 | 5 | C | C | D | B | B | B |
| 37 | t-17 | 5 | B | D | D | B | D | B |
| 38 | t-18 | 5 | B | D | D | B | D | B |
| 39 | t-19 | 5 | B | D | D | B | D | B |
| 40 | t-20 | 5 | B | D | D | B | D | B |

In Tables 9 and 10:
Comp. Example: Comparison Example
Type: Type of agent for processing urethane elastomer fibers As can be clearly understood from the results shown in Tables 9 and 10, the agents and the methods for processing urethane elastomer fibers according to this invention make it possible to obtain a package having superior roll shape and unwinding property in the production of urethane elastomer fibers. It is also made possible to provide superior smoothness, antistatic property and hot melt adhesive property to urethane elastomer fibers. As a result, it becomes possible to obtain urethane elastomer fibers of a high quality under a stable operation condition.

What is claimed is:

1. An agent for processing polyurethane elastomer fibers, said agent consisting of 80-99.99% by mass of a disperse medium and 0.01-20% by mass of a dispersoid for a total of 100% by mass, said dispersoid being prepared so as to have an average particle size of 0.01-500 μm as measured by a specified measuring method;

wherein said disperse medium is a liquid consisting of 70-100% by mass of mineral oil and 0-30% by mass of silicone oil and/or liquid ester oil for a total of 100% by mass and having a viscosity of $2\times10^{-6}$-$1000\times10^{-6}$ m²/s at 25° C.;

wherein said dispersoid is one or more aliphatic compounds having a melting point of 25° C. or above selected from the group consisting of aliphatic ester compounds shown by Formula 1, aliphatic ester compounds shown by Formula 2, aliphatic ester compounds shown by Formula 3 and aliphatic ester compounds shown by Formula 4 where Formula 1 is $R^1$—O—$X^1$, Formula 2 is $X^2$—O-A-O—$X^3$, Formula 3 is

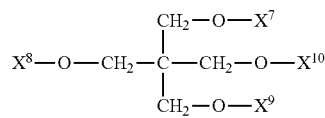

and Formula 4 is

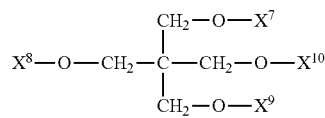

where $R^1$ is a straight-chain aliphatic hydrocarbon group with 14-50 carbon atoms, a branched aliphatic hydrocarbon group with 14-50 carbon atoms or cycloalkyl group with 5 or 6 carbon atoms; A is a residual group obtained by removing all hydroxy groups from (poly)oxyalkylene glycol with 2-30 carbon atoms having within its molecule (poly)oxyalkylene group formed with oxyalkylene unit with 2-10 carbon atoms; $X^1$ is an acyl group shown by Formula 5, which is

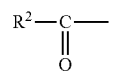

$R^2$ being a straight-chain aliphatic hydrocarbon group with 13-49 carbon atoms, a branched aliphatic hydrocarbon group with 13-49 carbon atoms or cycloalkyl group with 5 or 6 carbon atoms; and $X^2$-$X^{10}$ are each acyl group shown by Formula 5 or hydrogen atom, at least one of $X^2$ and $X^3$ in Formula 2 being acyl group shown by Formula 5, at least one of $X^4$-$X^6$ in Formula 3 being acyl group shown by Formula 5, at least one of $X^7$-$X^{10}$ in Formula 4 being acyl group shown by Formula 5; and wherein said specified measuring method comprises the steps of obtaining a diluted liquid by diluting said agent for processing polyurethane elastomer fibers by using a 1/1 mixture in mass ratio of polydimethyl siloxane and mineral oil both with viscosity of $10\times10^{-6}$ m²/s at 25° C. such that the concentration of dispersoid in the agent for processing polyurethane elastomer fibers becomes 1000 mg/L and providing said diluted liquid to a laser diffraction particle size analyzer at liquid temperature of 25° C. to measure the average particle size on volume standard.

2. The agent of claim 1 wherein $R^1$ in Formula 1 is alkyl group with 18-38 carbon atoms.

3. The agent of claim 1 wherein A in Formula 2 is a residual group obtained by removing all hydroxy groups from ethylene glycol, propylene glycol or 1,4-butanediol.

4. The gent of claim 1 wherein $R^2$ in Formula 5 is alkyl group with 17-37 carbon atoms.

5. The agent of claim 1 wherein said dispersoid comprises one or more aliphatic ester compounds selected from the group consisting of aliphatic ester compounds shown by Formula 2 and aliphatic ester compounds shown by Formula 3.

6. The agent of claim 1 wherein said disperse medium comprises 85-100% by mass of mineral oil and 0-15% by mass of silicone oil and/or liquid ester oil for a total of 100% by mass and having a viscosity of $2\times10^{-6}$-$100\times10^{-6}$ m²/s at 25° C.

7. The agent of claim 5 wherein said disperse medium comprises 85-100% by mass of mineral oil and 0-15% by mass of silicone oil and/or liquid ester oil for a total of 100% by mass and having a viscosity of $2\times10^{-6}$-$100\times10^{-6}$ m²/s at 25° C.

8. The agent of claim 1 wherein said dispersoid is prepared so as to have an average particle size of 0.1-100 μm.

9. The agent of claim 5 wherein said dispersoid is prepared so as to have an average particle size of 0.1-100 μm.

10. The agent of claim 7 wherein said dispersoid is prepared so as to have an average particle size of 0.1-100 μm.

11. A method of processing polyurethane elastomer fibers comprising the step of causing an agent according to claim 1 to adhere to said polyurethane elastomer fibers at a rate of 0.1-10% by mass during a spinning process of said polyurethane elastomer fibers by a neat oiling method without dilution.

12. A method of processing polyurethane elastomer fibers comprising the step of causing an agent according to claim 8 to adhere to said polyurethane elastomer fibers at a rate of 0.1-10% by mass during a spinning process of said polyurethane elastomer fibers by a neat oiling method without dilution.

13. A method of processing polyurethane elastomer fibers comprising the step of causing an agent according to claim 9 to adhere to said polyurethane elastomer fibers at a rate of 0.1-10% by mass during a spinning process of said polyurethane elastomer fibers by a neat oiling method without dilution.

14. A method of processing polyurethane elastomer fibers comprising the step of causing an agent according to claim 10 to adhere to said polyurethane elastomer fibers at a rate of 0.1-10% by mass during a spinning process of said polyurethane elastomer fibers by a neat oiling method without dilution.

15. Polyurethane elastomer fibers obtained by the method of claim 11.

16. Polyurethane elastomer fibers obtained by the method of claim 14.

* * * * *